_(12)_ United States Patent
Leung et al.

(10) Patent No.: US 7,684,794 B1
(45) Date of Patent: Mar. 23, 2010

(54) MANAGING ENDPOINT ADDRESSES SEPARATELY FROM MANAGING ENDPOINT MOBILITY

(75) Inventors: Kent K. Leung, Los Altos, CA (US); Milind M. Kulkarni, San Jose, CA (US); Jayaraman R. Iyer, Sunnyvale, CA (US)

(73) Assignee: Cisco Technologies, Inc., San Jose, CA (US)

( * ) Notice: Subject to any disclaimer, the term of this patent is extended or adjusted under 35 U.S.C. 154(b) by 360 days.

(21) Appl. No.: 11/173,060

(22) Filed: Jul. 1, 2005

(51) Int. Cl.
*H04W 4/00* (2009.01)

(52) U.S. Cl. ............... 455/432.3; 455/436; 455/443; 455/439; 370/331; 370/328; 370/329

(58) Field of Classification Search ............. 370/338, 370/331, 469, 328, 329; 455/436, 443, 432.1, 455/439
See application file for complete search history.

(56) References Cited

U.S. PATENT DOCUMENTS 6,535,493 B1 * 3/2003 Lee et al. ............... 370/329

2003/0212774 A1 * 11/2003 Lee et al. ............... 709/222
2004/1012029   *  6/2004 Liu et al. ............... 370/338
2004/0137888 A1 * 7/2004 Ohki ..................... 455/417
2006/0018280 A1 * 1/2006 Kumar et al. .......... 370/331

OTHER PUBLICATIONS

Chang Woo Pyo, "A Dynamic and Distributed Domain-Based Mobility Management Method for Mobile IPv6", Oct. 6-9, 2003, IEEE, vol. 3, 1965.*
S. Glass, "*Mobile IP Agents as DHCP Proxies*", Internet Engineering Task Force, Internet Draft, Mobile IP Working Group, 21 pages, Mar. 2001.

* cited by examiner

*Primary Examiner*—Vincent P Harper
*Assistant Examiner*—Khai M Nguyen
(74) *Attorney, Agent, or Firm*—Baker Botts L.L.P.

(57) ABSTRACT

Performing management operations for a mobile node present in a foreign network includes performing an address management operation and a mobility management operation. The address management operation includes receiving an address request message at a home address server of a home network of the mobile node, assigning a fixed home address to the mobile node, and sending an address acknowledgment message communicating the fixed home address. The mobility management operation includes receiving a registration request message requesting registration for the mobile node, and registering the mobile node in response to the registration request message.

23 Claims, 4 Drawing Sheets

MANAGING ENDPOINT ADDRESSES SEPARATELY FROM MANAGING ENDPOINT MOBILITY

TECHNICAL FIELD

This invention relates generally to the field of telecommunications and more specifically to managing endpoint addresses separately from managing endpoint mobility.

BACKGROUND

A network system may include multiple communication networks through which a mobile node may pass. The location of the mobile node may be tracked in order to forward packets to the mobile node. A home network of the mobile node includes a home agent that maintains the address of the mobile node and forwards data to the mobile node. The mobile node may move from the home network to a foreign network. A foreign agent of the foreign network may provide the home agent with a forwarding address to which packets for the mobile node may be forwarded.

Typically, when a mobile node boots up in a foreign network, it requires an address such as an Internet Protocol (IP) address. Known techniques for providing IP addresses to mobile nodes in foreign networks, however, are inefficient in certain situations. It is generally desirable to have efficient methods of providing IP addresses in certain situations.

SUMMARY OF THE DISCLOSURE

In accordance with the present invention, disadvantages and problems associated with previous techniques for providing addresses to mobile nodes may be reduced or eliminated.

According to one embodiment of the present invention, performing management operations for a mobile node present in a foreign network includes performing an address management operation and a mobility management operation. The address management operation includes receiving an address request message at a home address server of a home network of the mobile node, assigning a fixed home address to the mobile node, and sending an address acknowledgment message communicating the fixed home address. The mobility management operation includes receiving a registration request message requesting registration for the mobile node, and registering the mobile node in response to the registration request message.

Certain embodiments of the invention may provide one or more technical advantages. A technical advantage of one embodiment may be that a home network of a mobile node provides a fixed home address to the mobile node when the mobile node is present in a foreign network. The mobile node may maintain the fixed home address as the mobile node moves to different foreign networks, instead of obtaining a new address with each move. Accordingly, the fixed home address may provide for more efficient address management.

Another technical advantage of one embodiment may be that address management is separated from mobility management. According to one embodiment, Dynamic Host Configuration Protocol (DHCP) may be used for address management, and mobile IP may be used to set up tunnels and route packets in order to manage mobility. Address management may be handled between the mobile node and an address server, and does not require the involvement of the mobility driver of the mobile node. Accordingly, the address server client of the mobile node does not need to be aware of the mobility driver.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
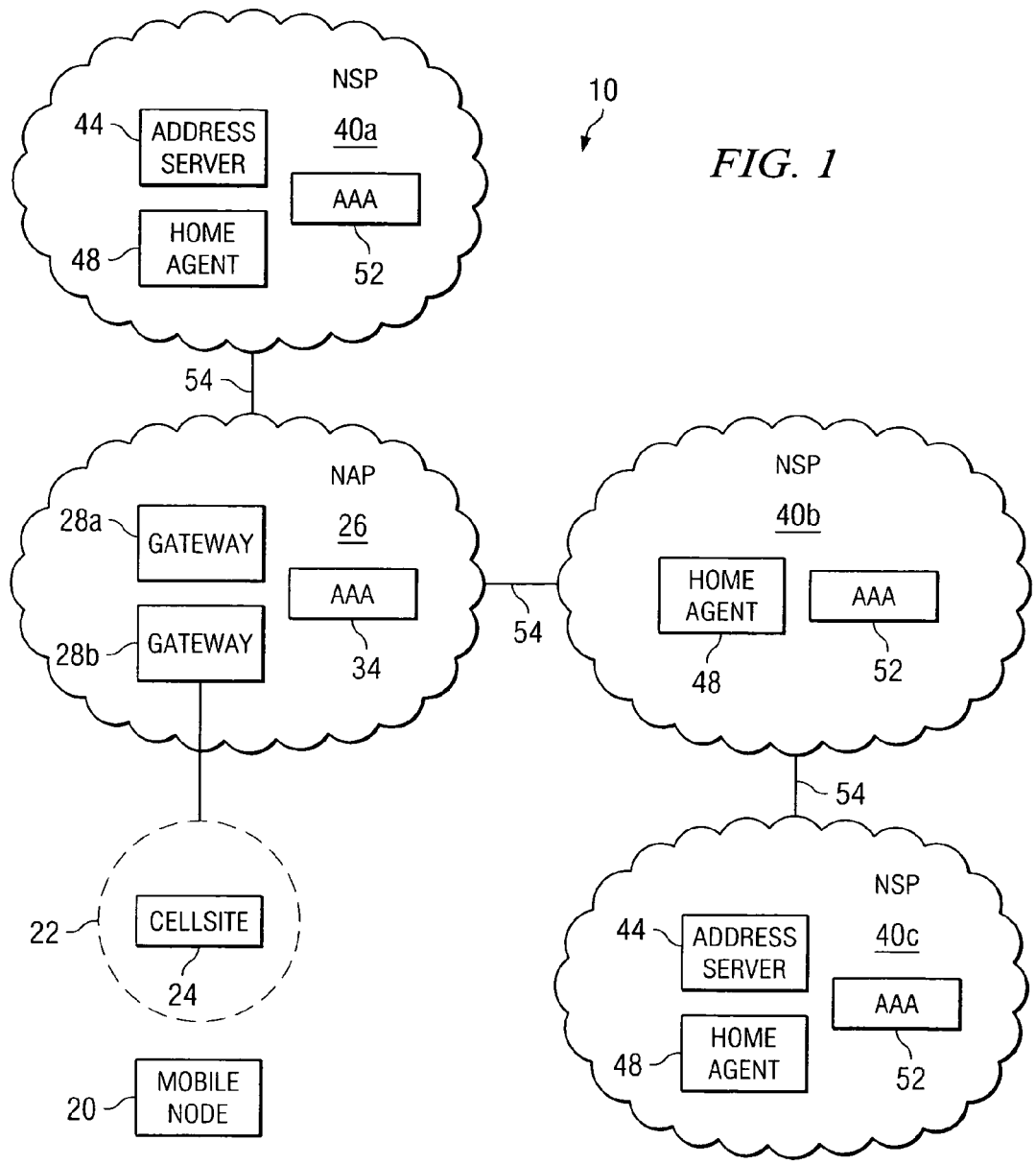
FIG. 1 is a block diagram illustrating one embodiment of a network system for managing endpoint addresses separately from managing endpoint mobility.

FIG. 1 is a block diagram illustrating one embodiment of a network system for managing endpoint addresses separately from managing endpoint mobility. The network system includes a home network of a mobile node. The home network provides a fixed home address to the mobile node when the mobile node is present in a foreign network. The mobile node may maintain the fixed home address as the mobile node moves to different foreign networks, instead of obtaining a new address with each move. Accordingly, the fixed home address may provide for more efficient address management.

Moreover, the network system separates address management from mobility management. According to one embodiment, Dynamic Host Configuration Protocol (DHCP) may be used for address management and host configuration, and mobile IP may be used to set up tunnels and route packets in order to manage mobility. Address management may be handled between the mobile node and an address server, and does not require the involvement of the mobility driver of the mobile node. Accordingly, the address server client of the mobile node does not need to be aware of the mobility driver.

According to the illustrated embodiment, a network system 10 operates to provide services such as communication sessions to endpoints such as a mobile node 20. A communication session may refer to an active communication between endpoints, measured from endpoint to endpoint. System 10 may comprise all or a portion of a communication network. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Information is communicated during a communication session. Information may refer to voice, data, text, audio, video, multimedia, control, signaling, other information, or any combination of the preceding. System 10 may communicate information in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 10 may utilize communication protocols and technologies to provide the communication sessions. Example communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, or other standards.

According to the illustrated embodiment, system 10 includes one or more mobile nodes 20, one or more cells 22, a network access provider (NAP) 26, and one or more network service providers (NSPS) 40, coupled by tunnels 54 as shown. Mobile node 20 represents any suitable device operable to communicate with a communication system. In general, a device may include any suitable arrangement of components operable to perform the operations of the device, and may comprise logic such as hardware, software, other logic, or any suitable combination of the preceding. Mobile node 20 may comprise, for example, a personal digital assistant, a computer such as a laptop, a cellular telephone, a mobile handset, or any other device operable to communicate with system 10.

Cell 22 represents a geographic unit of a network attachment point of a communication network. As an example, cell 22 may represent a cell of a cellular network or a hot spot of a wireless network. A cell 22 may have a cell identifier. Cell site 24 represents an access point that provides wireless services to mobile node 20 present in, or visiting, cell 22. A mobile node 20 may be present in, or visiting, cell 22 if mobile node 20 is within the range of cell site 24 of cell 22. An access point may refer to a network point that couples a wireless network, such as a wireless radio network, to a wired network, such as a wired area network.

Cell site 24 may facilitate a handoff procedure by redirecting packets, such as traffic or control packets, in response to movement of mobile node 20. A handoff procedure may refer to the process by which a communication session for mobile node 20 is passed from a previous cell site 24 to a current cell site 24 as mobile node 20 moves from a previous cell 22 to a current cell 22. A previous cell 22 refers to the cell 22 in which mobile node 20 is present prior to a handoff, and a current cell 22 refers to the cell 22 in which mobile node 20 is present after the handoff.

A cell site 24 may comprise any suitable logic operable to provide wireless services to mobile nodes 20 present in cell 22. According to one embodiment, cell site 24 includes a base transceiver station and a base station controller. The base transceiver station communicates signals to and from mobile node 20 through a wireless link that is typically a radio frequency link. The base station controller manages the operation of the base transceiver station.

Network access provider 26 represents a communication network that provides access to a global communication network. For example, network access provider 26 may represent a telephone company that provides access to the Internet. Network access provider 26 includes one or more gateways 28 and an authorization server (AAA) 34.

Gateway 28 represents any suitable device operable to interconnect with a network service provider. For example, gateway 28 may represent an access server network (ASN) gateway or other suitable first hop IP router. Gateway 28 may perform other suitable operations, such as convert communications between different communication protocols.

Authorization server 34 may represent any suitable device operable to provide authorization-related services. Authorization-related services may include services for authentication, authorization, accounting, or any suitable combination of the preceding. Authentication may refer to validating the identity of mobile node 20. Authorization may refer to authorizing a level of service for mobile node 20. Accounting may refer to tracking the usage of resources. As an example, authorization server 34 may provide one, two, or three of the listed services.

A network service provider 40 represents a point of attachment that provides a service. For example, a network service provider 40 may represent a telephone company, such as a local exchange carrier or an interexchange carrier, an application service provider, or an Internet service provider. Network service providers 40a and 40c each include an address server 44, a home agent 48, and an authorization server 52. Network service provider 40b includes a home agent 48 and an authorization server (AAA) 52.

An address server 52 assigns temporary or permanent addresses to endpoints. For example, an address server 52 may comprise a Dynamic Host Configuration Protocol (DHCP) server that assigns IP addresses. Authorization server 52 may be substantially similar to authorization server 34.

A home network of a mobile node 20 refers to a communication network that maintains the address of the mobile node 20. The home network includes a home agent 48 that maintains the address of mobile node 20 and forwards data to mobile node 20. A foreign network refers to a communication network, other than the home network, in which mobile node 20 is present. A foreign network includes a foreign agent 48 that provides home agent 48 of mobile node 20 with a forwarding address, or care-of address, to which data for mobile node 20 may be forwarded.

Tunnels 54 may comprise virtual private network (VPN) tunnels. A tunnel may refer to a secure communication path, and may communicate messages between networks coupled by the tunnel. According to one embodiment, tunnels 54 are used to send address request messages directly to the home network, which assigns a fixed home address to mobile node 20.

A component of system 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of home agent 48 and authorization server 52 may be performed by one module, or the operations of gateway 28 may be performed by more than one module. Additionally, operations of system 10 may be performed using any suitable logic comprising software, hardware, other logic, or any suitable combination of the preceding. As used in this document, "each" refers to each member of a set or each member of a subset of a set.

Figure 2:
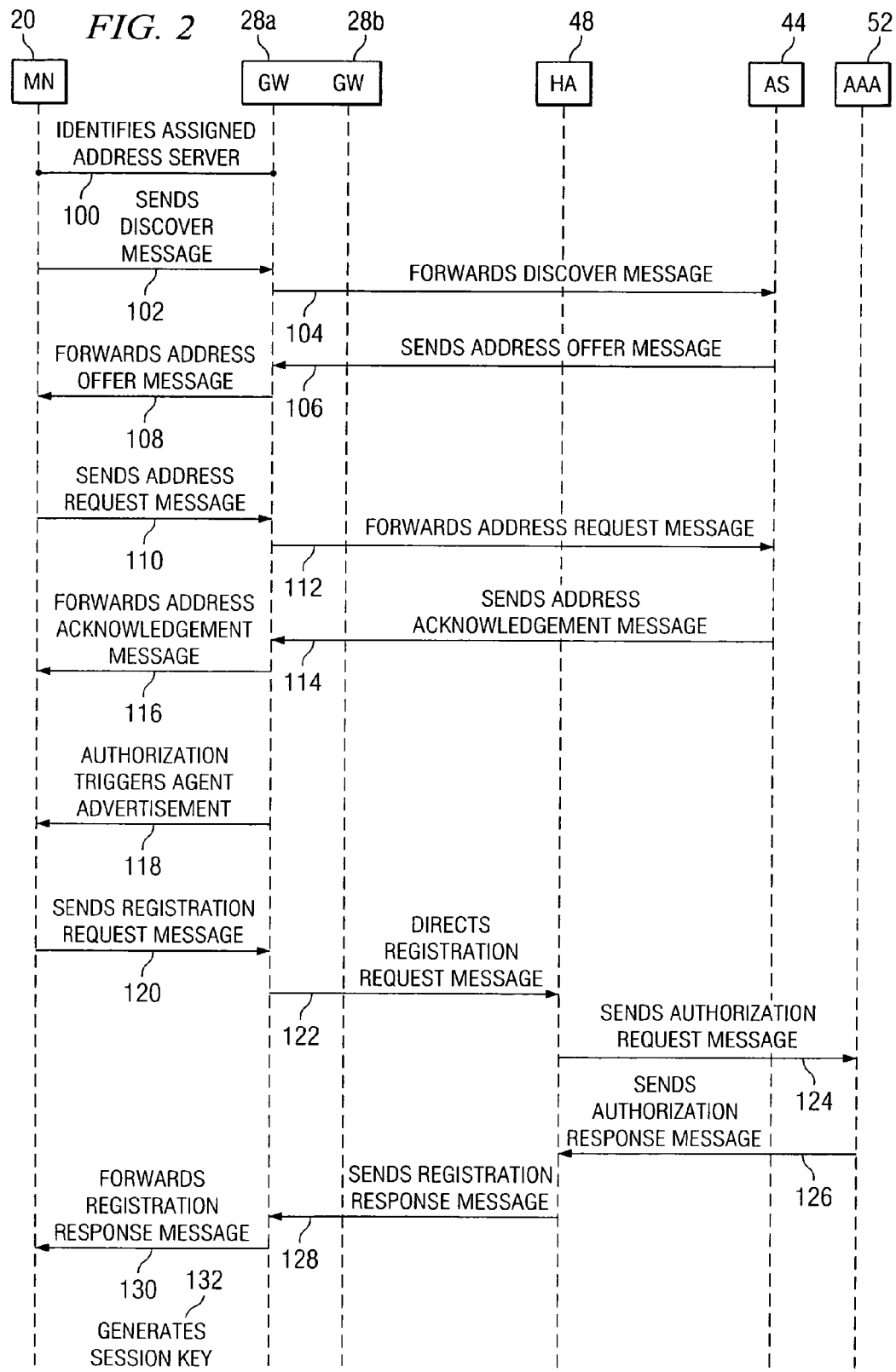
FIG. 2 is a flowchart illustrating one embodiment of a method for performing address management and mobility management.

FIG. 2 is a flowchart illustrating one embodiment of a method for performing address management and mobility management. According to the embodiment, address management is performed, and then mobility management is performed. During address management, a home network 40 provides a fixed home address to a mobile node 20 in a foreign network 40. During mobility management, tunnels 54 between gateways 28 and home agents 48 are created.

The method is described with reference to mobile node 20, which has a mobile node identifier. Home agent 48 of home network 40 maintains the address of mobile node 20. The method begins at step 100, where the address server 44 assigned to mobile node 20 is identified. The assigned address server 44 may be identified during access authentication of mobile node 20. Mobile node 20 sends a discover message at step 102. A discover message may be used to discover address server 44, and may comprise, for example, a DHCP discover message.

Gateway 28a forwards the discover message to address server 44 at step 104. Address server 44 sends an address offer message to gateway 28a in response to the discover message at step 106. An address offer message may offer to provide an address, and may comprise a DHCP offer message that offers to provide an IP address. Gateway 28a forwards the address offer message to mobile node 20 at step 108.

Mobile node 20 sends an address request message at step 110. An address request message requests an address, and may comprise a DHCP request that requests an IP address. Gateway 28a forwards the address request message to address server 44 at step 112. Address server 44 sends an address acknowledgment message to gateway 28a at step 114. An address acknowledgment message provide the address to mobile node 20, and may comprise may comprise a DHCP acknowledgment message. According to one embodiment, the address acknowledgment message includes a fixed home address for mobile node 20, and may also include the home agent address and one or more host configuration parameters. Gateway 28a forwards the address acknowledgment message to mobile node at step 116.

The authorization of mobile node 20 triggers an agent advertisement operation at step 118. The agent advertisement operation may refer to an operation in which a router informs local nodes of its existence and capabilities, and may refer to a mobile IP agent advertisement operation. The address of gateway 28a may be used as the care-of address for mobile node 20.

Mobile node 20 sends a registration request message at step 120. A registration request message requests registration for mobile node 20. The registration request message may include the mobile node identifier, the fixed home address, the care-of address, the home agent address, other address, or any combination of the preceding. According to one embodiment, the registration request may also include a key generation request and a mobile node-authorization server key. A key generation request requests creation of a key between mobile node 20 and home agent 48. A mobile node-authorization server key is a key for communication between mobile node 20 and authorization server 52.

Gateway 28a directs the registration request to the requested home agent 48 at step 122. Home agent 48 sends an authorization request message to authorization server 52 at step 124. An authorization request message requests authorization for mobile node 20. According to one embodiment, home agent 48 may identify authorization server 52 from the key generation request. The authorization request message may include the key generation request.

Authorization server 52 authorizes mobile node 20, and may derive a mobile node-home agent key from the mobile node-authorization server key. Authorization server 52 sends an authorization response message to home agent 48 at step 126. The authorization response message may include the mobile node-home agent key. Home agent 48 sends a registration response message to gateway 28a at step 128. The registration response message may include the mobile node identifier, the fixed home address, the care-of address, the home agent address, other address, or any combination of the preceding. According to one embodiment, the registration response message may also include a key generation response that includes the mobile node-home agent key.

Gateway 28 forwards the registration response to mobile node 20 at step 130. Mobile node 20 generates a session key at step 132. Mobile node 20 may generate a mobile node-home agent session key that allows mobile node 20 to set up a tunnel between mobile node 20 and home agent 48. After establishing the session key, the method terminates.

Modifications, additions, or omissions may be made to the method without departing from the scope of the invention. The method may include more, fewer, or other steps. Additionally, steps may be performed in any suitable order without departing from the scope of the invention.

As an example, a network node may provide signaling on behalf of mobile node 20. According to the example, step 120 may be modified as follows. As mobile node 20 is authenticated, the authentication may trigger gateway 28a to send a registration request message to home agent 28. After receiving the registration response message at step 122, gateway 28a may set up a tunnel between gateway 28a and home agent 48.

Figure 3:
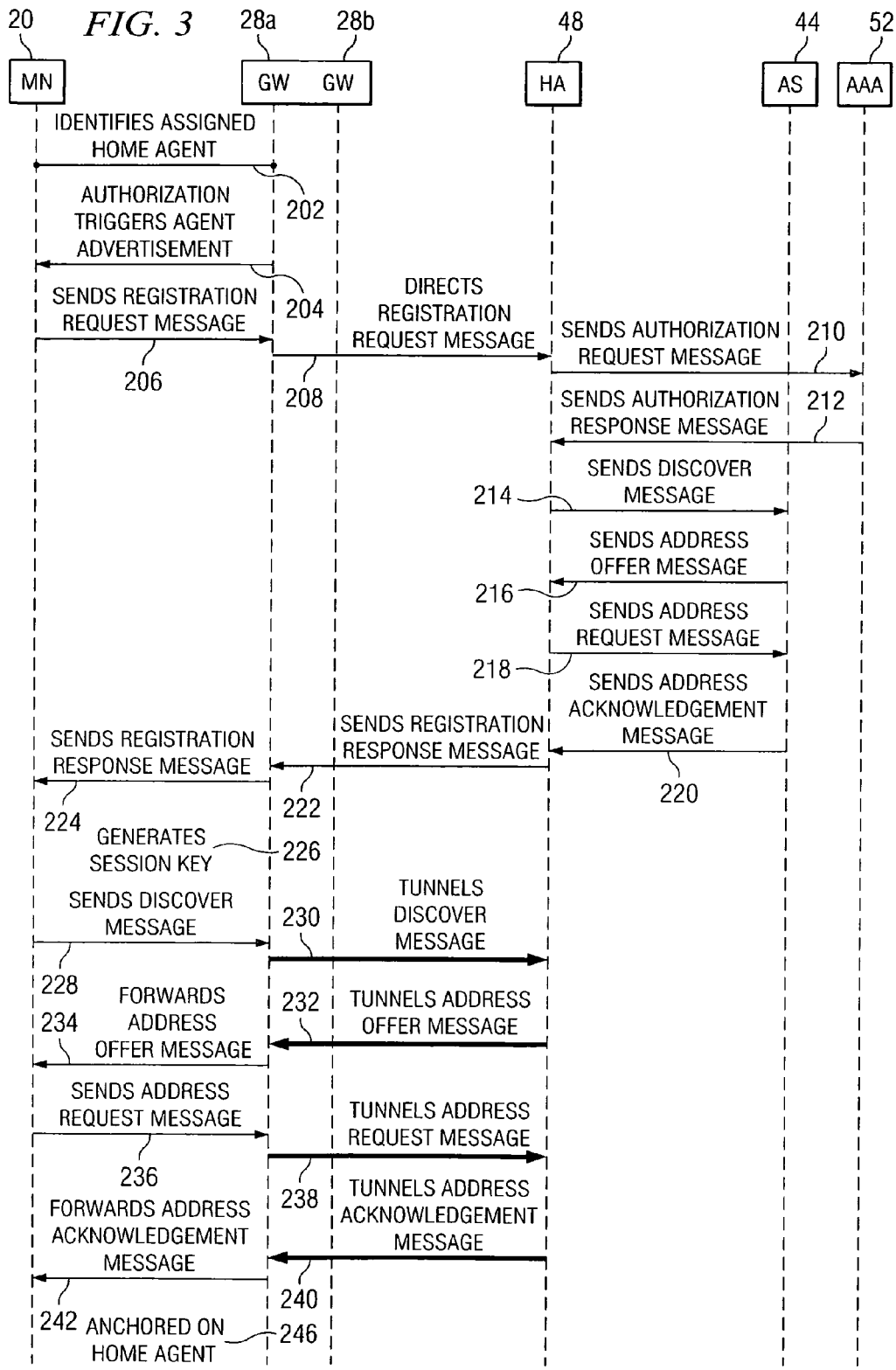
FIG. 3 is a flowchart illustrating one embodiment of a method for performing mobility management and address management.

FIG. 3 is a flowchart illustrating one embodiment of a method for performing mobility management and address management. According to the embodiment, mobility management is performed, and then address management is performed. During mobility management, tunnels between gateways 28 and home agents 48 are created. During address management, a home network 40 provides a fixed home address to mobile node 20 in foreign network 40.

The method is described with reference to mobile node 20, which has a mobile node identifier. Home agent 48 of home network 40 maintains the address of mobile node 20. The method begins at step 202, where the address server 44 assigned to mobile node 20 is identified. Authorization of mobile node 20 triggers an agent advertisement operation at step 204. The address of gateway 28a may be used as the care-of address for mobile node 20.

Mobile node 20 sends a registration request message at step 206. The registration request message may include the mobile node identifier, the care-of address, other address, or any combination of the preceding, but typically does not include a home address or a home agent address. According to one embodiment, the registration request message may also include a key generation request and a mobile node-authorization server key. Gateway 28a directs the registration request message to home agent 48 at step 208. Home agent 48 sends an authorization request message to authorization server 52 at step 210. Authorization server 52 authorizes mobile node 20 and sends an authorization response message at step 212.

Home agent 48 may operate as an address server proxy on behalf of mobile node 20 at steps 214 through 220. Home agent 48 sends a discover message to authorization server 52 at step 214. Authorization server 52 sends an address offer message to home agent 48 at step 216. Home agent 48 sends an address request message to address server 44 at step 218. Address server 44 sends an address acknowledgment message to home agent 48 at step 220. Home agent 48 may send a registration response message to gateway 28a at step 222. Gateway 28a sends the registration response message to mobile node 20 at step 224. Mobile node 20 generates a session key at step 226.

Mobile node 20 broadcasts a discover message upon link up status at step 228. Gateway 28a tunnels the discovery message to home agent 48 at step 230. The tunneling may be based on the MAC address in the message. Home agent 48 tunnels an address offer message to gateway 28a at step 232. Gateway 28a forwards the address offer message to mobile node 20 at step 234.

Mobile node 20 sends an address request message to gateway 28a at step 236. Gateway 28a tunnels the address request message to home agent 48 at step 238. Home agent 48 tunnels an address acknowledgment message to gateway 28a at step 240. Gateway 28a forwards the address acknowledgment message to mobile node 20 at step 242. Mobile node 20 is anchored on home agent 48 at step 246. After mobile node 20 is anchored, the method terminates.

Modifications, additions, or omissions may be made to the method without departing from the scope of the invention. The method may include more, fewer, or other steps. Additionally, steps may be performed in any suitable order without departing from the scope of the invention.

As an example, a network node may provide signaling on behalf of mobile node 20. According to the example, steps 202 to 208 may be modified as follows. As mobile node 20 is authenticated, the authentication may trigger gateway 28a to send a registration request message to home agent 28. Moreover, steps 224 and 226 may be modified. After receiving the registration response message at step 222, gateway 28a may set up a tunnel between gateway 28a and home agent 48.

Figure 4:
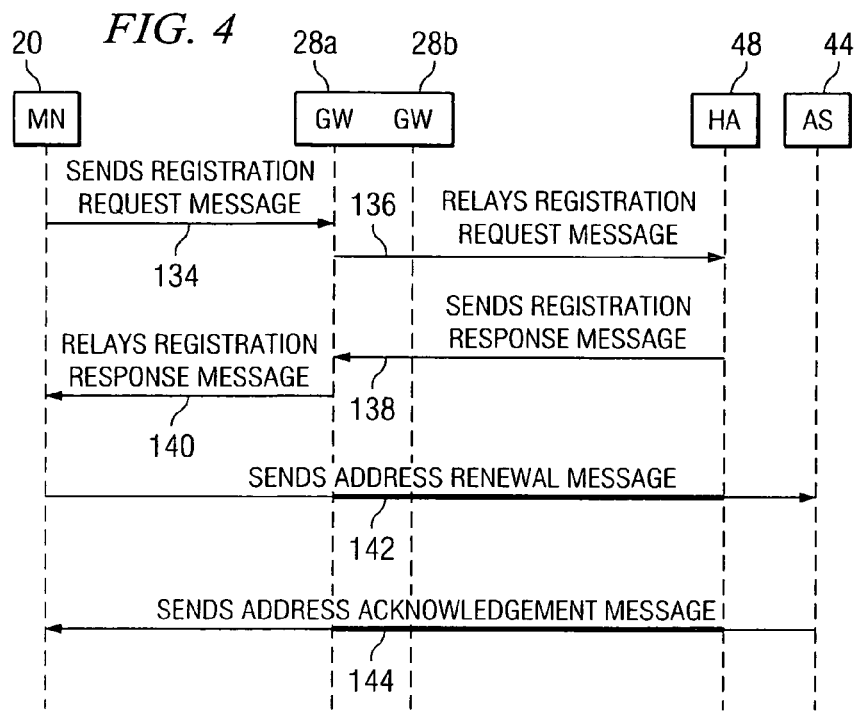
FIG. 4 is a flowchart illustrating one embodiment of a method for performing mobility re-registration and address renewal.

FIG. 4 is a flowchart illustrating one embodiment of a method for performing mobility re-registration and address renewal. The method may be performed in conjunction with any other suitable method, for example, the methods of FIGS. 2 and 3.

The method begins at step 134. Steps 134 through 140 describe the mobility re-registration process. Mobile node 20 sends a registration request message to gateway 28a at step 134. The registration request may include the mobile node identifier, the fixed home address, the home agent address, the care-of address, other address, or any combination of the preceding. According to one embodiment, the message may also include a mobile node-authorization server key.

Gateway 28a relays the registration request message to home agent 48 at step 136. Home agent 48 sends a registration response message to gateway 28a at step 138. Gateway 28a relays the registration response message to mobile node 20 at step 140.

Steps 142 and 144 describe the address renewal process. Address renewal messages may be exchanged between mobile node 20 and address server 44, so home agent 48 and gateway 28 need not be involved. According to one embodiment, the messages may be exchanged through a tunnel created using the mobile node-authorization server key. Mobile node 20 sends an address renewal message to address server 44 at step 142. The address renewal message requests address renewal, and may comprise a DHCP renewal message. Address server 44 sends an address acknowledgment message to mobile node 20 at step 144. After the address acknowledgment message is sent, the method terminates.

Modifications, additions, or omissions may be made to the method without departing from the scope of the invention. The method may include more, fewer, or other steps. Additionally, steps may be performed in any suitable order without departing from the scope of the invention.

As an example, a network node may provide signaling on behalf of mobile node 20. According to the example, steps 134 and 140 may be omitted as gateway 28a sends and receives the registration messages.

Figure 5:
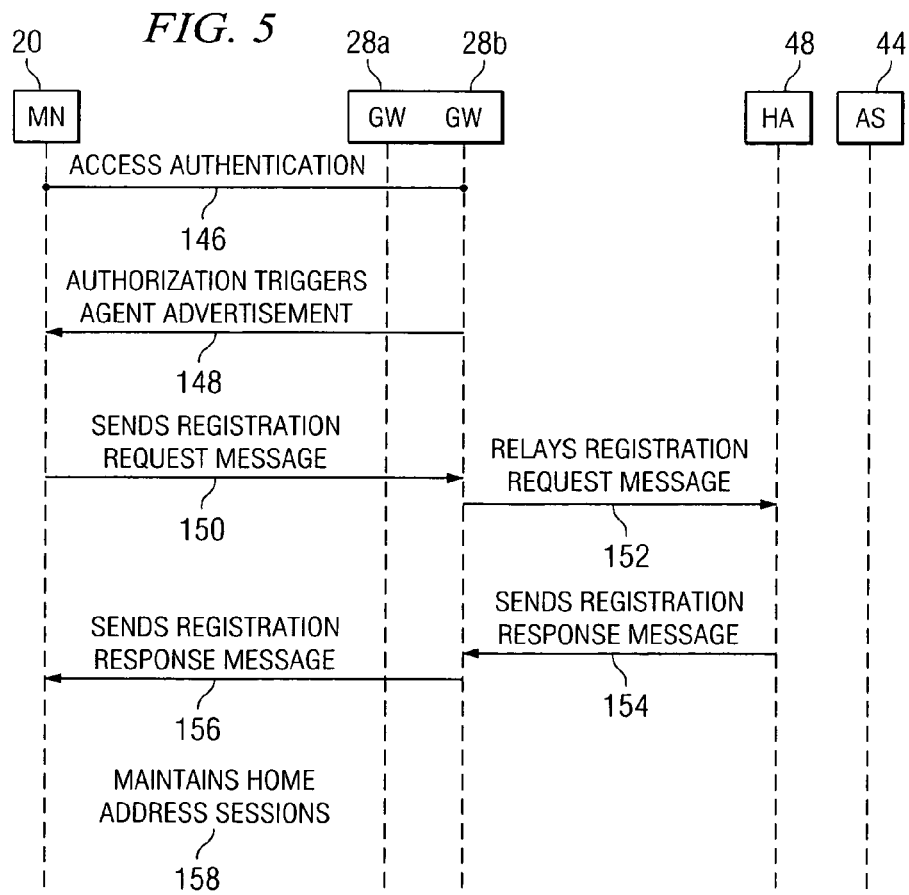
FIG. 5 is a flowchart illustrating one embodiment of a method for performing a handover procedure.

FIG. 5 is a flowchart illustrating one embodiment of a method for performing a handoff procedure. The method may be performed in conjunction with any other suitable method, for example, the methods of FIGS. 2 and 3.

The method begins at step 146, where access authentication is performed between mobile node 20 and gateway 28b. The authorization triggers an agent advertisement operation at step 148. Mobile node 20 sends a registration request message at step 150. The registration request message may be substantially similar to that of step 136.

Gateway 28b relays the registration request message to home agent 48. Home agent 48 authorizes mobile node 20 and sends a registration response message at step 154. The registration response message may be substantially similar to the registration response message of step 138. Gateway 28b sends the registration response message to mobile node at step 156. Mobile node maintains the home address sessions at gateway 28b at step 158. The method then terminates.

Modifications, additions, or omissions may be made to the method without departing from the scope of the invention. The method may include more, fewer, or other steps. Additionally, steps may be performed in any suitable order without departing from the scope of the invention.

As an example, a network node such as gateway 28a may provide signaling on behalf of mobile node 20. According to the example, steps 148 and 150 may be replaced by gateway 28a sending registration request information to gateway 28b. Additionally, step 156 may be omitted.

Certain embodiments of the invention may provide one or more technical advantages. A technical advantage of one embodiment may be that a home network of a mobile node provides a fixed home address to the mobile node when the mobile node is present in a foreign network. The mobile node may maintain the fixed home address as the mobile node moves to different foreign networks, instead of obtaining a new address with each move. Accordingly, the fixed home address may provide for more efficient address management.

Another technical advantage of one embodiment may be that address management is separated from mobility management. According to one embodiment, Dynamic Host Configuration Protocol (DHCP) may be used for address management, and mobile IP may be used to set up tunnels and route packets in order to manage mobility. Address management may be handled between the mobile node and an address server, and does not require the involvement of the mobility driver of the mobile node. Accordingly, the address server client of the mobile node does not need to be aware of the mobility driver.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for performing a plurality of management operations for a mobile node, comprising:
performing an address management operation for a mobile node present in a foreign network, the address management operation comprising:
receiving an address request message at a home address server of a home network of the mobile node, the address request message requesting an address for the mobile node; assigning, by the home network, a fixed home address to the mobile node in place of assigning an address that changes with each move, the fixed home address assigned while the mobile node is present in the foreign network; and sending an address acknowledgment message to the mobile node present in the foreign network, the address acknowledgment message communicating the fixed home address;
performing a mobility management operation for the mobile node, the mobility management operation comprising:
receiving a registration request message requesting registration for the mobile node; and registering the mobile node in response to the registration request message; and
performing a next address management operation for the mobile node present in a next foreign network, the next address management operation comprising:
receiving a next address request message at the home address server, the next address request message requesting a next address for the mobile node; assigning, by the home network, the same fixed home address to the mobile node in place of assigning another address that changes with each move, the fixed home address assigned while the mobile node is present in the next foreign network; and sending a next address acknowledgment message to the mobile node present in the foreign network, the address acknowledgment message communicating the same fixed home address.

2. The method of claim 1, wherein:
performing the address management operation further comprises:
performing the address management operation prior to performing the mobility management operation; and
performing the mobility management operation further comprises:
registering the mobile node using the fixed home address.

3. The method of claim 1, wherein:
performing the mobility management operation further comprises:
performing the mobility management operation prior to performing the address management operation; and
providing the fixed home address to the home agent; and
performing the address management operation further comprises:
providing the fixed home address in a registration response message.

4. The method of claim 1, wherein:
receiving the address request message further comprises:
receiving the address request message from a gateway operating on behalf of the mobile node; and
receiving the registration request message further comprises:
receiving the registration request message from the gateway.

5. The method of claim 1, wherein:
receiving the address request message further comprises:
receiving the address request message from the mobile node; and
receiving the registration request message further comprises:
receiving the registration request message from the mobile node.

6. The method of claim 1, further comprising:
receiving a next address request message at the home address server along a communication path, the communication path bypassing the home agent.

7. A network system for performing a plurality of management operations for a mobile node, comprising:
a home address server of a home network of a mobile node, the home address server operable to:
perform an address management operation for the mobile node present in a foreign network by: receiving an address request message requesting an address for the mobile node, the address request message received from a gateway operating on behalf of the mobile node and from the mobile node; assigning, by the home network, a fixed home address to the mobile node in place of assigning an address that changes with each move, the fixed home address assigned while the mobile node is present in the foreign network; and sending an address acknowledgment message communicating the fixed home address to the mobile node present in the foreign network;
perform a mobility management operation for the mobile node by: receiving a registration request message requesting registration for the mobile node; and registering the mobile node in response to the registration request message; and
perform a next address management operation for the mobile node present in a next foreign network by: receiving a next address request message requesting a next address for the mobile node, the next address request message received along a communication path bypassing a home agent operable to receive the registration request message from the gateway and the mobile node; assigning, by the home network, the same fixed home address to the mobile node while the mobile node is present in the next foreign network; and sending a next address acknowledgment message communicating the same fixed home address to the mobile node present in the foreign network.

8. The network system of claim 7, the home address server further operable to:
receive a next address request message, the mobile node present in a next foreign network; and
send a next address acknowledgment message to the mobile node, the next address acknowledgment message communicating the fixed home address.

9. The network system of claim 7, wherein:
the address management operation further comprises:
performing the address management operation prior to performing the mobility management operation; and
the mobility management operation further comprises:

registering the mobile node using the fixed home address.

10. The network system of claim 7, wherein:
the mobility management operation further comprises:
performing the mobility management operation prior to performing the address management operation; and
providing the fixed home address to the home agent; and
the address management operation further comprises:
providing the fixed home address in a registration response message.

11. The network system of claim 7, wherein:
the home address server is further operable to receive the address request message from a gateway operating on behalf of the mobile node; and
the home agent is further operable to receive the registration request message from the gateway.

12. The network system of claim 7, wherein:
the home address server is further operable to receive the address request message from the mobile node; and
the home agent is further operable to receive the registration request message from the mobile node.

13. The network system of claim 7, the home address server is further operable to:
receive a next address request message along a communication path, the communication path bypassing the home agent.

14. The network system of claim 7, wherein:
if the address management operation further comprises:
performing the address management operation prior to performing the mobility management operation; and
then the mobility management operation further comprises:
registering the mobile node using the fixed home address;
if the mobility management operation further comprises:
performing the mobility management operation prior to performing the address management operation; and
providing the fixed home address to the home agent; and
then the address management operation further comprises:
providing the fixed home address in a registration response message.

15. A system for performing a plurality of management operations for a mobile node, comprising:
means for performing an address management operation for a mobile node present in a foreign network, the address management operation comprising:
receiving an address request message at a home address server of a home network of the mobile node, the address request message requesting an address for the mobile node; assigning, by the home network, a fixed home address to the mobile node in place of assigning an address that changes with each move, the fixed home address assigned while the mobile node is present in the foreign network; and sending an address acknowledgment message to the mobile node present in the foreign network, the address acknowledgment message communicating the fixed home address; and
means for performing a mobility management operation for the mobile node, the mobility management operation comprising:
receiving a registration request message requesting registration for the mobile node; and registering the mobile node in response to the registration request message; and means for performing a next address management operation for the mobile node present in a next foreign network, the next address management operation comprising:
receiving a next address request message at the home address server, the next address request message requesting a next address for the mobile node; assigning, by the home network, the same fixed home address to the mobile node in place of assigning another address that changes with each move, the fixed home address assigned while the mobile node is present in the next foreign network; and sending a next address acknowledgment message to the mobile node present in the foreign network, the address acknowledgment message communicating the same fixed home address.

16. A method for performing a plurality of management operations for a mobile node, comprising:
receiving a registration request message requesting registration for a mobile node present in a foreign network;
sending an address request message to a home address server of a home network of the mobile node, the address request message requesting an address for the mobile node;
receiving an address acknowledgment message, the address acknowledgment message communicating a fixed home address assigned to the mobile node by the home network in place of assigning an address that changes with each move, the fixed home address assigned while the mobile node is present in the foreign network;
providing the fixed home address to the mobile node; and
receiving a next address acknowledgment message, the next address acknowledgment message communicating the same fixed home address assigned to the mobile node by the home network in place of assigning another address that changes with each move, the same fixed home address assigned while the mobile node is present in a next foreign network.

17. The method of claim 16, wherein providing the fixed home address to the mobile node further comprises:
sending a registration response message to the mobile node, the registration response message comprising a mobile node-home agent key, the mobile node-home agent key operable to create a tunnel between the mobile node and the home agent; and
providing the fixed home address using the tunnel.

18. A home agent operable to perform a mobility management operation for a mobile node, comprising:
an interface operable to communicate a plurality of messages; and
a processor coupled to the interface and operable to:
receive a registration request message requesting registration for a mobile node present in a foreign network;
send an address request message to a home address server of a home network of the mobile node, the address request message requesting an address for the mobile node;
receive an address acknowledgment message, the address acknowledgment message communicating a fixed home address assigned to the mobile node by the home network in place of assigning an address that changes with each move, the fixed home address assigned while the mobile node is present in the foreign network;
provide the fixed home address to the mobile node; and receive a next address acknowledgment message, the next address acknowledgment message communicating the same fixed home address assigned to the mobile node by the home network in place of assigning another address that changes with each move, the same fixed home address assigned while the mobile node is present in a next foreign network.

19. The home agent of claim 18, further operable to provide the fixed home address to the mobile node by:
sending a registration response message to the mobile node, the registration response message comprising a mobile node-home agent key, the mobile node-home agent key operable to create a tunnel between the mobile node and the home agent; and
providing the fixed home address using the tunnel.

20. A method for performing a plurality of management operations for a mobile node, comprising:
receiving an address request message at a home address server of a home network of a mobile node, the address request message requesting an address for the mobile node present in a foreign network;
assigning, by the home network, a fixed home address to the mobile node in place of assigning an address that changes with each move, the fixed home address assigned while the mobile node is present in the foreign network;
sending an address acknowledgment message to the mobile node present in the foreign network, the address acknowledgment message communicating the fixed home address;
re-registering the mobile node present in a next foreign network;
receiving a next address request message, the next address request message requesting a next address for the mobile node;
assigning, by the home network, the same fixed home address to the mobile node in place of assigning another address that changes with each move, the fixed home address assigned while the mobile node is present in the next foreign network; and
sending a next address acknowledgment message to the mobile node, the next address acknowledgment message communicating the same fixed home address.

21. The method of claim 20, wherein:
re-registering the mobile node further comprises:
sending a registration response message to the mobile node, the registration response message comprising a mobile node-address server key, the mobile node-address server key operable to create a tunnel between the mobile node and the home address server; and
sending the next address acknowledgment message further comprises:
sending the next address acknowledgment message using the tunnel.

22. A home address server operable to performing an address management operation for a mobile node, comprising:
an interface operable to communicate a plurality of messages; and
a processor coupled to the interface and operable to:
receive an address request message at a home address server of a home network of a mobile node, the address request message requesting an address for the mobile node present in a foreign network;
assign, by the home network, a fixed home address to the mobile node in place of assigning an address that changes with each move, the fixed home address assigned while the mobile node is present in the foreign network;
send an address acknowledgment message to the mobile node present in the foreign network, the address acknowledgment message communicating the fixed home address;
re-register the mobile node present in a next foreign network;
receive a next address request message, the next address request message requesting a next address for the mobile node;
assign, by the home network, the same fixed home address to the mobile node in place of assigning another address that changes with each move, the fixed home address assigned while the mobile node is present in the next foreign network; and
send a next address acknowledgment message to the mobile node, the next address acknowledgment message communicating the fixed home address.

23. The home address server of claim 22, further operable to:
re-register the mobile node by:
sending a registration response message to the mobile node, the registration response message comprising a mobile node-address server key, the mobile node-address server key operable to create a tunnel between the mobile node and the home address server; and
send the next address acknowledgment message by:
sending the next address acknowledgment message using the tunnel.

\* \* \* \* \*